(12) United States Patent
Isogai et al.

(10) Patent No.: US 9,082,183 B2
(45) Date of Patent: Jul. 14, 2015

(54) IMAGE PROCESSING DEVICE AND IMAGE PROCESSING METHOD

(75) Inventors: Kuniaki Isogai, Osaka (JP); Masayuki Misaki, Hyogo (JP); Junichi Tagawa, Kyoto (JP); Takashi Kawamura, Kyoto (JP); Takashi Fujii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 13/814,259

(22) PCT Filed: Jun. 5, 2012

(86) PCT No.: PCT/JP2012/003682
§ 371 (c)(1),
(2), (4) Date: Feb. 5, 2013

(87) PCT Pub. No.: WO2012/169174
PCT Pub. Date: Dec. 13, 2012

(65) Prior Publication Data
US 2013/0136342 A1 May 30, 2013

(30) Foreign Application Priority Data
Jun. 8, 2011 (JP) ................................. 2011-128651

(51) Int. Cl.
*G06K 9/00* (2006.01)
*G06T 7/00* (2006.01)
(Continued)

(52) U.S. Cl.
CPC ................ *G06T 7/0051* (2013.01); *G06T 3/00* (2013.01); *G06T 15/205* (2013.01); *H04N 13/0011* (2013.01); *H04N 13/0022* (2013.01); *G06K 9/00* (2013.01)

(58) Field of Classification Search
CPC ..................... G01C 11/06; G06T 2207/10012; G06T 2207/20228; G06T 7/0022; G06T 7/0018; G06T 15/20; G06T 15/00; H04N 13/0011; H04N 2013/0081; H04N 5/2226; H04N 13/0022; G06K 9/32; G06K 2209/40; G03B 35/20
USPC ......... 382/154, 282, 284, 285, 103, 153, 162, 382/164, 167, 209; 345/419, 424, 653
See application file for complete search history.

(56) References Cited

U.S. PATENT DOCUMENTS 5,280,280 A * 1/1994 Hotto ............................. 345/94
5,561,537 A * 10/1996 Aritake et al. .................. 359/23

(Continued)

FOREIGN PATENT DOCUMENTS

JP          11-351865        12/1999
JP          2002-290964      10/2002

(Continued)

OTHER PUBLICATIONS

International Search Report issued Jul. 3, 2012 in International (PCT) Application No. PCT/JP2012/003682.

*Primary Examiner* — Vu Le
*Assistant Examiner* — Aklilu Woldemariam
(74) *Attorney, Agent, or Firm* — Wenderoth, Lind & Ponack, L.L.P.

(57) ABSTRACT

A data input unit is configured to receive an input image, depth data and a shooting parameter. A parameter input unit receives a transformation parameter as a parameter on projective transformation of a three-dimensional model, a transformed image generating unit that generate a transformed image by performing projective transformation based on the transformation parameter in the three-dimensional model obtained from the input image, the depth data, and the shooting parameter. A blank area detecting unit detects a blank area in the transformed image, the blank area being a group of blank pixels having no corresponding pixel in the input image, and an output unit is configured to output the transformed image in the case where a blank value indicating size of the blank area is smaller than or equal to a threshold value.

14 Claims, 16 Drawing Sheets

(51) Int. Cl.
*G06T 15/20* (2011.01)
*G06T 3/00* (2006.01)
*H04N 13/00* (2006.01)

(56) References Cited

U.S. PATENT DOCUMENTS

| | | | |
|---|---|---|---|
| 5,923,820 A * | 7/1999 | Cunnagin et al. | 358/1.8 |
| 6,384,859 B1 * | 5/2002 | Matsumoto et al. | 348/43 |
| 6,442,293 B1 | 8/2002 | Ito et al. | |
| 6,631,206 B1 * | 10/2003 | Cheng et al. | 382/164 |
| 6,633,685 B1 * | 10/2003 | Kusama et al. | 382/284 |
| 6,754,378 B2 | 6/2004 | Ito et al. | |
| 7,116,818 B2 | 10/2006 | Ito et al. | |
| 7,542,034 B2 * | 6/2009 | Spooner et al. | 345/419 |
| 8,659,795 B2 * | 2/2014 | Nakamura | 358/1.9 |
| 2001/0045979 A1 | 11/2001 | Matsumoto et al. | 348/43 |
| 2002/0126910 A1 * | 9/2002 | Gindele et al. | 382/254 |
| 2002/0191839 A1 | 12/2002 | Ito et al. | |
| 2003/0068093 A1 * | 4/2003 | Baggs | 382/261 |
| 2003/0194136 A1 * | 10/2003 | Fujii et al. | 382/209 |
| 2004/0013295 A1 * | 1/2004 | Sabe et al. | 382/153 |
| 2004/0131248 A1 | 7/2004 | Ito et al. | |
| 2005/0196070 A1 * | 9/2005 | Takakura et al. | 382/284 |
| 2007/0273686 A1 * | 11/2007 | Watanabe et al. | 345/419 |
| 2008/0088650 A1 * | 4/2008 | Chen et al. | 345/690 |
| 2008/0308670 A1 * | 12/2008 | Meyer et al. | 244/3.1 |
| 2008/0316328 A1 * | 12/2008 | Steinberg et al. | 348/222.1 |
| 2008/0317339 A1 * | 12/2008 | Steinberg et al. | 382/167 |
| 2009/0016601 A1 * | 1/2009 | Kunugi et al. | 382/162 |
| 2009/0079764 A1 * | 3/2009 | Lin et al. | 345/660 |
| 2009/0116732 A1 * | 5/2009 | Zhou et al. | 382/154 |
| 2009/0129630 A1 * | 5/2009 | Gloudemans et al. | 382/103 |
| 2011/0080463 A1 | 4/2011 | Endo et al. | |
| 2011/0090351 A1 * | 4/2011 | Cote et al. | 348/208.1 |
| 2011/0169776 A1 * | 7/2011 | Ouchi | 345/175 |
| 2011/0242418 A1 * | 10/2011 | Hosokawa et al. | 348/576 |
| 2012/0243733 A1 * | 9/2012 | Sawai | 382/103 |
| 2013/0120473 A1 * | 5/2013 | Yamada | 345/690 |
| 2013/0162861 A1 * | 6/2013 | Yamamoto | 348/222.1 |
| 2013/0287296 A1 * | 10/2013 | Li et al. | 382/167 |
| 2013/0322753 A1 * | 12/2013 | Lim et al. | 382/167 |

FOREIGN PATENT DOCUMENTS

| | | |
|---|---|---|
| JP | 2010-250452 | 11/2010 |
| JP | 2011-044828 | 3/2011 |
| JP | 2011-081605 | 4/2011 |

* cited by examiner

FIG. 15
(a)
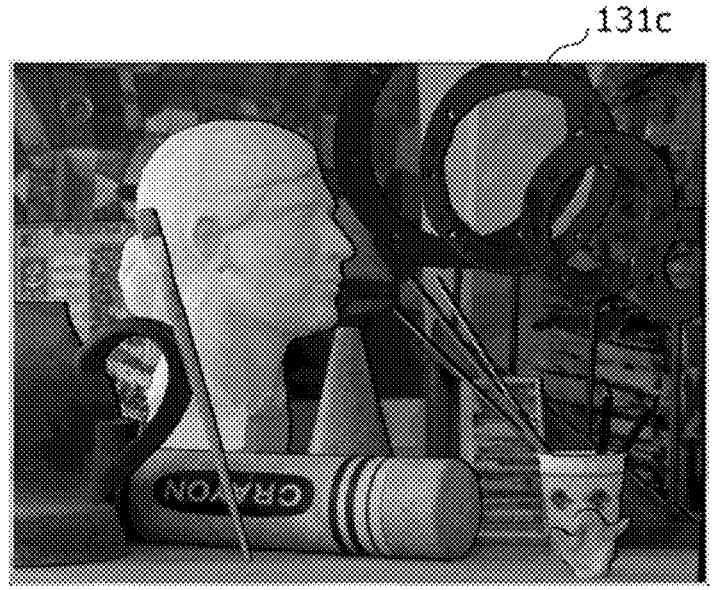
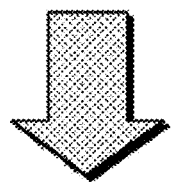
(b)
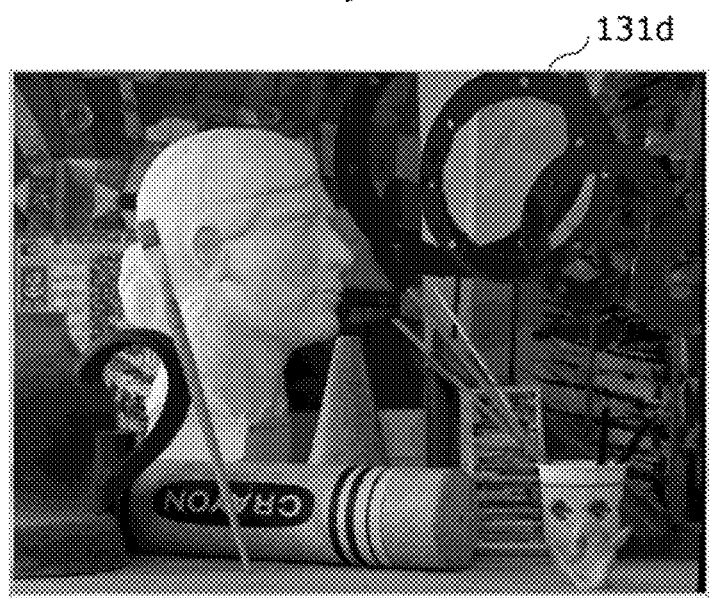

IMAGE PROCESSING DEVICE AND IMAGE PROCESSING METHOD

TECHNICAL FIELD

The present invention relates to an image processing device and an image processing method that generate a transformed image by performing projective transformation in a three-dimensional model obtained from an input image.

BACKGROUND OF INVENTION

Background Art

In recent years, a user has frequently edited images taken with a digital still camera, a digital video camera, and the like. For example, the user designates a partial area of an input image via a GUI (Graphical User Interface), and enlarges an image of a subject on the partial area. In such case, the image of the subject is merely enlarged or reduced, and an image obtained as if it is taken with a camera at close range from the subject cannot be acquired.

There is proposed a method of generating an image of an subject by combining subject's input images taken from a plurality of directions with each other to generate a three-dimensional model, and performing projective transformation from any view point in the generated three-dimensional model (Refer to PTL 1, for example). According to such method, it is possible to obtain such subject's image as if it is taken with the camera at close range from the subject, or as if it is taken from directions that are different from an actual direction of the camera.

CITATION LIST

Patent Literature

[PTL 1] Japanese Unexamined Patent Application Publication No. 2002-290964

SUMMARY OF INVENTION

However, according to the above-mentioned conventional method, the quality of the transformed image may be greatly degraded.

Thus, the present invention is conceived in consideration of the above-mentioned situations, and its object is to provide an image processing device and an image processing method that can reduce degradation of the quality of a transformed image generated by performing projective transformation in a three-dimensional model obtained from an input image.

An image processing device according to one aspect of the present invention includes a data input unit configured to receive an input image, depth data indicating depth of the input image, and a shooting parameter of the input image; a parameter input unit configured to receive a transformation parameter as a parameter on projective transformation of a three-dimensional model; a transformed image generating unit configured to generate a transformed image by performing projective transformation based on the transformation parameter in the three-dimensional model obtained from the input image, the depth data, and the shooting parameter; a blank area detecting unit configured to detect a blank area in the transformed image, the blank area being a group of blank pixels that do not correspond to any pixel in the input image; and an output unit configured to output the transformed image in the case where a blank value indicating size of the blank area is smaller than or equal to a threshold value.

These general or specific modes may be implemented by a system, a device, a method, an integrated circuit, a computer program, or a recording medium such as a computer-readable CD-ROM (Compact Disc Read Only Memory), or may be implemented by any combination of the system, the device, the method, the integrated circuit, the computer program, and the recording medium.

According to one aspect of the present invention, in the case where the transformed image is generated by performing projective transformation in the three-dimensional model obtained from the input image, degradation of the quality of the transformed image can be reduced.

BRIEF DESCRIPTION OF DRAWINGS

FIG. 15 is a view showing an example of a transformed image obtained by complementing a blank area.

Figure 1:
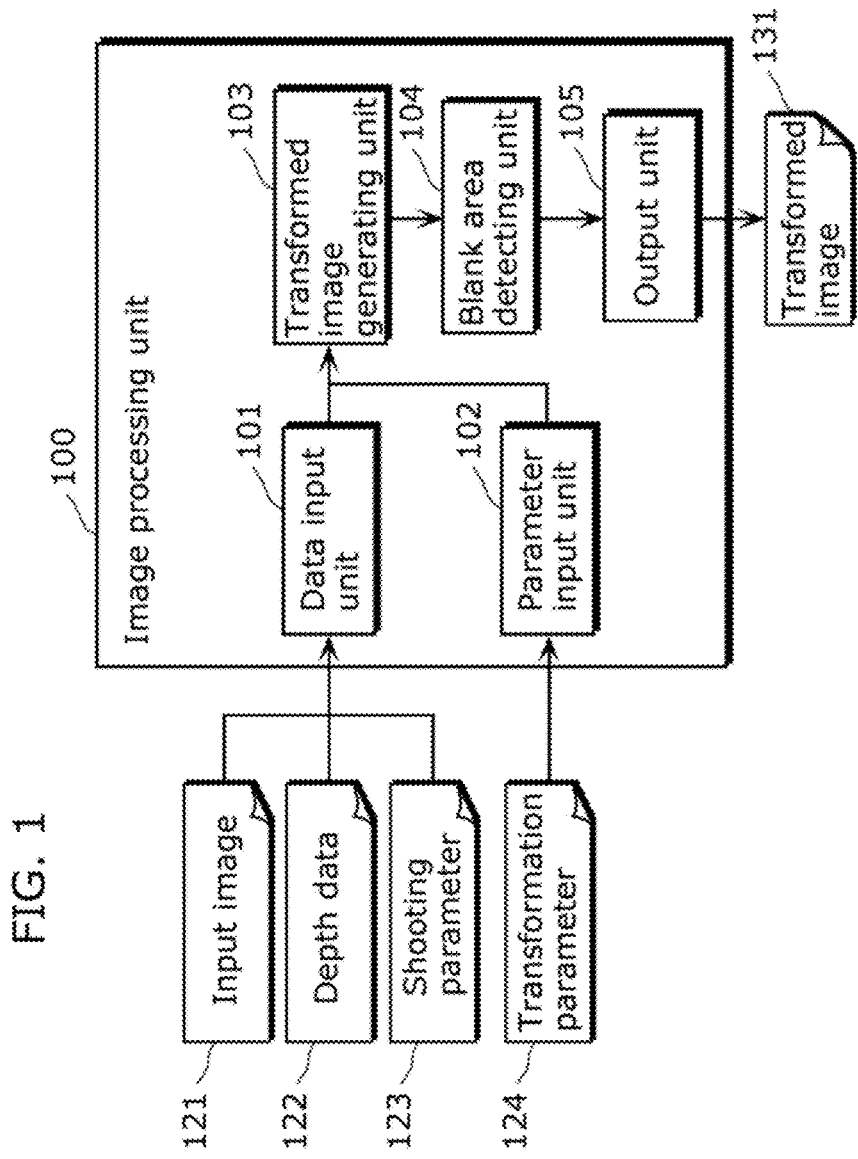
FIG. 1 is a block diagram showing a functional configuration of an image processing device in accordance with First embodiment.

DETAILED DESCRIPTION OF INVENTION (Summary of the Present Invention)

According to the conventional method, the quality of a transformed image may greatly degrade. For example, a blank area including no image corresponding to an input image may occur in the transformed image generated by projective transformation. In such case, the quality of the transformed image greatly degrades.

An image processing device from one aspect of the present invention includes a data input unit configured to receive an input image, depth data indicating depth of the input image, and a shooting parameter of the input image; a parameter input unit configured to receive a transformation parameter as a parameter on projective transformation of a three-dimensional model; a transformed image generating unit configured to generate a transformed image by performing projective transformation based on the transformation parameter in the three-dimensional model obtained from the input image, the depth data, and the shooting parameter; a blank area detecting unit configured to detect a blank area in the transformed image, the blank area being a group of blank pixels that do not correspond to any pixel in the input image; and an output unit configured to output the transformed image in the case where a blank value indicating size of the blank area is smaller than or equal to a threshold value.

With this configuration, it can be switched whether or not the transformed image is outputted according to the size of the blank area detected in the transformed image. Therefore, it is possible to reduce the occurrence of outputting of the transformed image of largely degraded quality due to a large blank area. In the case where the blank area is large, for example, by performing projective transformation based on another transformation parameter, the blank area can be reduced, thereby reducing degradation of the quality of the transformed image.

For example, the blank area detecting unit may detect a plurality of blank areas, each of the blank areas being configured of a group of adjacent blank pixels, and the output unit may be configured to output the transformed image in the case where a largest blank value among blank values of the plurality of blank areas is smaller than or equal to the threshold value.

Generally, a large number of dispersed small blank areas exert a larger effect on degradation of the image quality than a small number of large blank areas. With this configuration, in the case where the largest blank value among the blank values of the plurality of blank areas is smaller than or equal to the threshold value, the transformed image can be outputted. That is, it can be switched whether or not the transformed image is outputted according to the blank area among the plurality of blank areas, which has a large effect on degradation of the image quality, thereby reducing the occurrence of outputting of the transformed image of largely degraded quality.

For example, the blank value may be a value weighted to increase the blank value of the blank area as the position of the blank area is closer to a center of the transformed image.

Generally, the blank area located at the center of the image exerts a larger effect on degradation of the image quality than the blank area located at an edge of the image. Thus, it can be switched whether or not the transformed image is outputted by using the weighted to increase the blank value of the blank area as the position of the blank area is closer to the center of the transformed image. That is, it can be switched whether or not the transformed image is outputted according to the blank area among the plurality of blank areas, which has a large effect on degradation of the image quality, thereby reducing the occurrence of outputting of the transformed image of largely degraded quality.

For example, the blank value may be a value weighted to increase the blank value of the blank area as an aspect ratio of the blank area is smaller.

Generally, the blank area having a smaller aspect ratio (that is, smaller difference between the vertical width and the horizontal width), among the blank areas having the same area, exerts a larger effect on degradation of the image quality. With this configuration, it can be switched whether or not the transformed image is outputted by using the blank value weighted to increase the blank value of the blank area as the aspect ratio of the blank area is smaller. That is, it can be switched whether or not the transformed image is outputted according to the blank area among the plurality of blank areas, which has a large effect on degradation of the image quality, thereby reducing the occurrence of outputting of the transformed image of largely degraded quality.

For example, a complementing unit configured to complement pixel values of pixels of the blank area on the basis of pixel values of pixels near the blank area may be further provided, and the output unit may output the transformed image with the complemented pixel values of the pixels of the blank area in the case where the blank value is smaller than or equal to the threshold value.

With this configuration, the pixel values of the pixels of the blank area can be complemented based on the pixel values of the pixels near the blank area. Therefore, degradation of the image quality due to the blank area can be reduced.

For example, the parameter input unit may be configured to receive an instruction from a user to change a view point with respect to the input image, as an input of the transformation parameter, and the transformed image generating unit may generate the transformed image by performing projective transformation based on the view point identified according to the transformation parameter.

With this configuration, projective transformation can be performed in response to the instruction from the user to change the view point with respect to the input image.

For example, the output unit may be further configured to output information for requesting inputting of another transformation parameter, in the case where the blank value is larger than the threshold value.

With this configuration, in the case where degradation of the quality of the transformed image is large, inputting of another transformation parameter can be requested. As a result, the transformed image can be generated based on the other transformation parameter to generate the transformed image of less degraded quality due to the blank area.

For example, the output unit may be configured to output information for highlighting an object for receiving an instruction from the user to initialize the transformation parameter, as the information for requesting inputting of the an other transformation parameter, in the case where blank value is larger than the threshold value.

With this configuration, in the blank value is larger than the threshold value, it is possible to highlight the object for receiving the instruction from the user to initialize the transformation parameter. Therefore, it is possible to promote the user to initialize the transformation parameter, thereby reducing degradation of the quality of the transformed image. In a user interface for image processing, the user's operability can be improved.

For example, the output unit may be further configured to output the transformed image previously outputted, in the blank value is larger than the threshold value.

With this configuration, in the case where degradation of the quality of the transformed image is large, the transformed image previously outputted can be outputted, thereby reducing the occurrence of outputting of the transformed image of degraded quality.

For example, the image processing device may further include a parameter calculating unit configured to calculate an interpolated transformation parameter by interpolating between the transformation parameter corresponding to the input image and the transformation parameter received by the parameter input unit, in the case where the blank value is larger than the threshold value, and the transformed image generating unit may generate a new transformed image by performing projective transformation based on the interpolated transformation parameter thus calculated.

With this configuration, in the case where degradation of the quality of the transformed image is large, the interpolated transformation parameter that is closer to the transformation parameter corresponding to the input image than the received transformation parameter can be automatically calculated. Therefore, degradation of the quality of the transformed image can be reduced.

For example, the parameter calculating unit the parameter calculating unit may be configured to calculate a sequence of the interpolated transformation parameters that in the sequence gradually become closer from the transformation parameter received by the parameter input unit to the transformation parameter corresponding to the input image until the blank value becomes smaller than or equal to the threshold value, the transformed image generating unit may be configured to generate a sequence of the transformed images on the basis of the interpolated transformation parameters, and the output unit may be configured to output the sequence of the transformed images.

With this configuration, the interpolated transformation parameter can be calculated such that the interpolated transformation parameter gradually becomes closer to the transformation parameter corresponding to the input image. Therefore, the transformation parameter that causes the transformed image to satisfy a predetermined quality can be automatically calculated. That is, degradation of the quality of the transformed image can be reduced.

With this configuration, the transformed images generated based on the interpolated transformation parameter thus calculated can be sequentially outputted. Therefore, the state where the quality of the transformed image is being improved can be presented like an animation to the user.

For example, the output unit may be further configured to output information representing a relationship between the blank value and the threshold value.

With this configuration, the extent of degradation of the image quality can be presented to the user. Therefore, in the user interface for image processing, the user's operability can be improved.

These general or specific modes may be implemented by a system, a device, a method, an integrated circuit, a computer program, or a recording medium such as a computer-readable CD-ROM, or may be implemented by any combination of the system, the device, the method, the integrated circuit, the computer program, and the recording medium.

Embodiments of the present invention will be described with reference to figures.

The below-mentioned embodiments each show one specific example of the present invention. Numeric values, shape, materials, components, arrangement and connection of the components, steps, and the order of steps in the below-mentioned embodiments are merely examples, and do not intend to limit the present invention. Among the components in the following embodiments, components that are not recited in independent claims defining the largest concept are described as optional components.

(First Embodiment)

FIG. 1 is a block diagram showing a functional configuration of an image processing device in accordance with First embodiment. The image processing device 100 includes a data input unit 101, a parameter input unit 102, a transformed image generating unit 103, a blank area detecting unit 104, and an output unit 105.

The data input unit 101 receives an input image 121, depth data 122, and shooting parameter 123. Hereinafter, a combination of the input image 121, the depth data 122, and the shooting parameter 123 is referred to as input data.

Specifically, the data input unit 101 reads the input data from a storage device such as an HDD (Hard Disk Drive) or a flash memory. For example, the data input unit 101 acquires the input data from an external device connected via a network.

The depth data 122 is data indicating depth of the input image. In the case where the input image is an image taken with a camera, the depth indicates a distance between the camera and a subject. Specifically, the depth data 122 includes, for example, a depth value of each of pixels included in the input image.

The shooting parameter 123 is parameter indicating capture conditions of the input image. In this embodiment, the shooting parameter includes an angle of view, a front end distance of the depth, and a rear end distance of the depth. It is noted that the shooting parameter 123 does not necessarily include the angle of view, the front end distance of the depth, and the rear end distance of the depth. For example, in the case where the depth value included in the depth data 122 is a normalized value, the shooting parameter 123 does not need to include the front end distance of the depth and the rear end distance of the depth.

The parameter input unit 102 receives a transformation parameter 124 as a parameter on projective transformation of the three-dimensional model. For example, the parameter input unit 102 receives an instruction from the user to change the view point with respect to the input image 121, as the transformation parameter.

The transformation parameter 124 is not necessarily the instruction to change the view point. For example, the transformation parameter may be information indicating the type of projective transformation (for example, perspective projection or orthogonal projection). For example, the transformation parameter 124 may be information indicating the angle of view.

The transformed image generating unit 103 performs projective transformation based on the transformation parameter 124 in the three-dimensional model obtained from the input image 121, the depth data 122, and the shooting parameter 123 to generate a transformed image 131. Details of the transformed image generating unit 103 will be described later with reference to other figures.

The blank area detecting unit 104 detects a blank area as a group of blank pixels in the transformed image 131. In this embodiment, the blank area detecting unit 104 detects the blank area constituted of a group of the adjacent blank pixels.

Here, the blank pixel refers to a pixel that is present in the transformed image and does not correspond to any pixel in the input image. That is, the blank pixel is a pixel where an image that is not included in the input image is located. In other words, the blank pixel is a pixel having no pixel value, or a pixel having a pixel value that is a default value.

The blank area detecting unit 104 does not necessarily detect the group of adjacent blank pixels as one blank area. For example, the blank area detecting unit 104 may detect a group of blank pixels that are dispersed (that is, are not adjacent to each other) in a predetermined range, as one blank area.

In the case where a blank value indicating a size of the blank area is smaller than or equal to a threshold value, the output unit 105 outputs the transformed image 131. In this embodiment, in the case where a largest blank value among blank values of the plurality of blank areas is smaller than or equal to the threshold value, the output unit 105 outputs the transformed image 131.

Here, a ratio of the number of pixels of the blank area to the number of pixels of the transformed image 131 is used as the blank value. The blank value is not necessarily such value. For example, the blank value may be the number of pixels of the blank area or an area of the blank area. Alternatively, for example, the blank value may be at least either a horizontal width or a vertical width of the blank area.

Next, various operations of the image processing device 100 thus constituted will be described.

Figure 2:
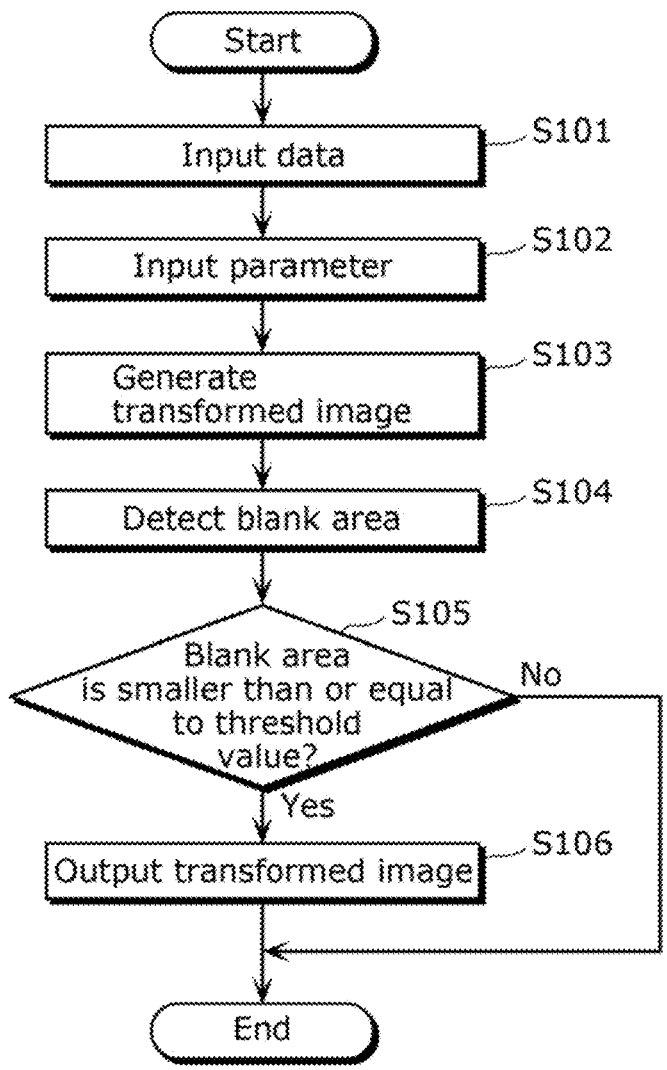
FIG. 2 is a flow chart showing processing of the image processing device in accordance with First embodiment.

FIG. 2 is a flow chart showing processing of the image processing device 100 in accordance with First embodiment. A case where the user inputs the instruction to change the view point will be described below.

First, the data input unit 101 receives input data (S101). Subsequently, the parameter input unit 102 receives the instruction to change the view point (transformation parameter) from the user (S102). Specifically, the parameter input unit 102 acquires the instruction to change the view point, which is inputted with respect to the input image displayed on a screen. In this case, the user inputs the instruction to change the view point, for example, by pointing out a position on the screen with an input means such as a mouse.

The transformed image generating unit 103 changes the view point according to the instruction in the three-dimensional model obtained from the input image, the depth data, and the shooting parameter to perform projective transformation, thereby generating the transformed image (S103). The processing of generating the transformed image will be described later.

Subsequently, the blank area detecting unit 104 detects the blank area in the transformed image (S104). Here, the blank area detecting unit 104 detects a group of adjacent blank pixels as one blank area.

The blank area detecting unit 104 determines whether or not the blank value is smaller than or equal to the threshold value (S105). Specifically, in the case where a plurality of blank areas is detected, the blank area detecting unit 104 determines whether or not a maximum value among the blank values is smaller than or equal to the threshold value. The threshold value may be experimentally or empirically set according to the extent to which the quality of the transformed image is degraded due to the blank area.

In the case where the blank value is smaller than or equal to the threshold value (Yes in S105), the output unit 105 outputs the transformed image (S106), and the processing is finished. As a result, for example, the transformed image transformed in response to the instruction to change the view point is displayed on the screen.

On the contrary, in the case where the blank value is larger than the threshold value (No in S105), the image processing device 100 finishes the processing without outputting the transformed image. As a result, for example, the input image as it is displayed on the screen. That is, change of the view point by the user is restricted.

As described above, the image processing device 100 can switch whether or not the transformed image is outputted according to the size of the blank area, thereby restricting editing of an image by the user.

Next, the processing of generating the transformed image by the transformed image generating unit 103 will be described in detail with reference to FIGS. 3 to 5. A case where the instruction to change the view point is inputted as the transformation parameter will be described.

Figure 3:
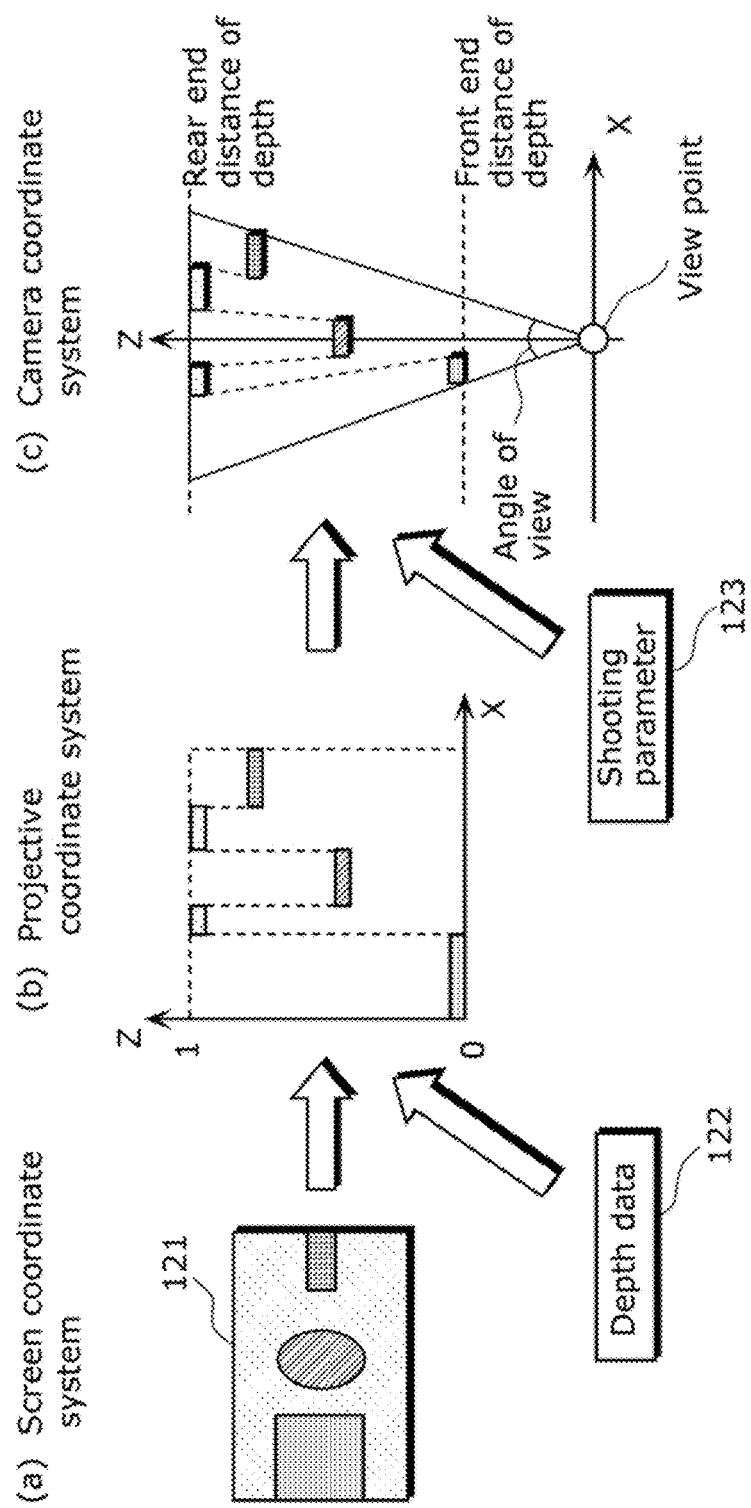
FIG. 3 is a view for describing an example of processing of a transformed image generating unit in accordance with First embodiment.
Figure 4:
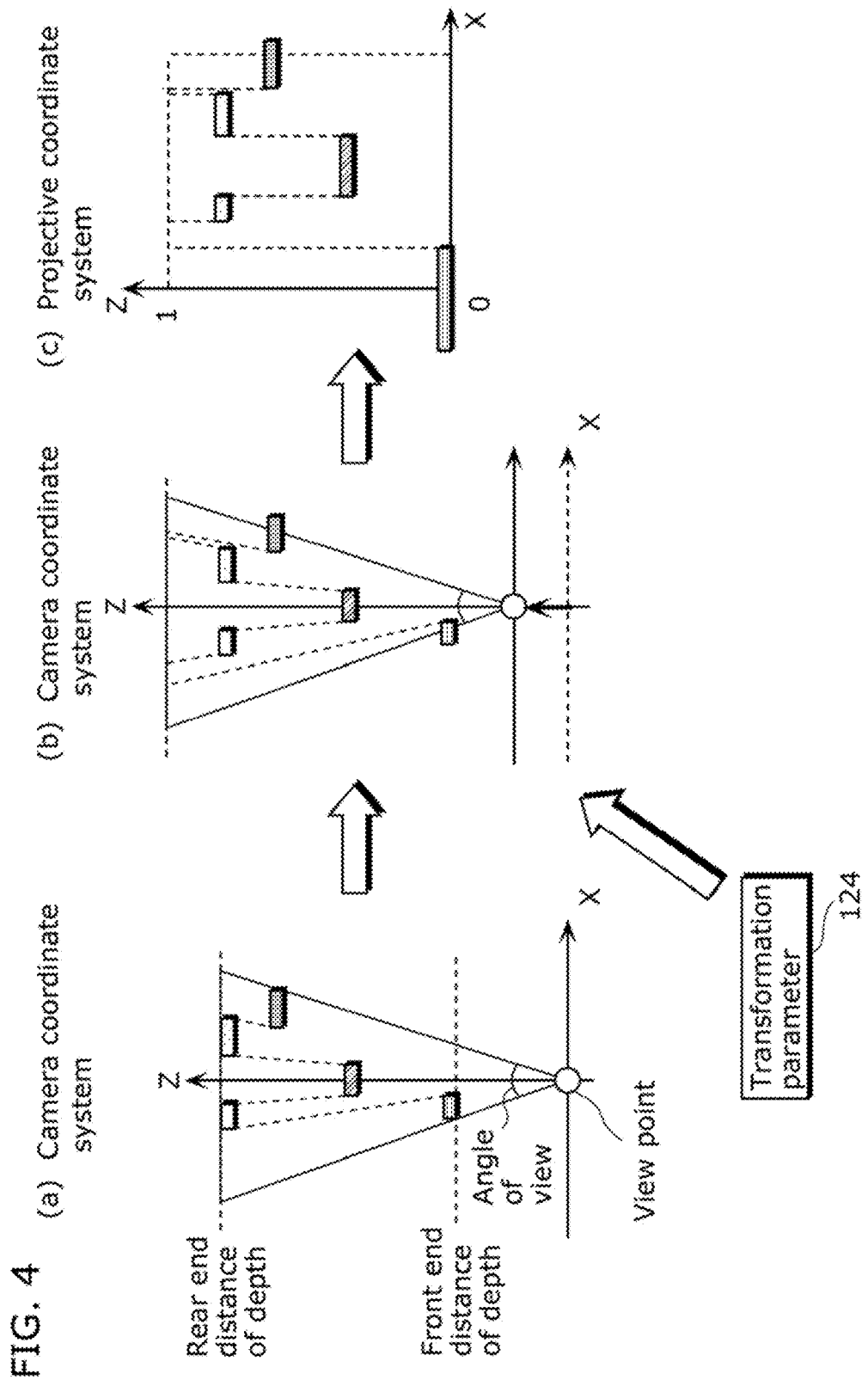
FIG. 4 is a view for describing an example of the processing of the transformed image generating unit in accordance with First embodiment.
Figure 5:
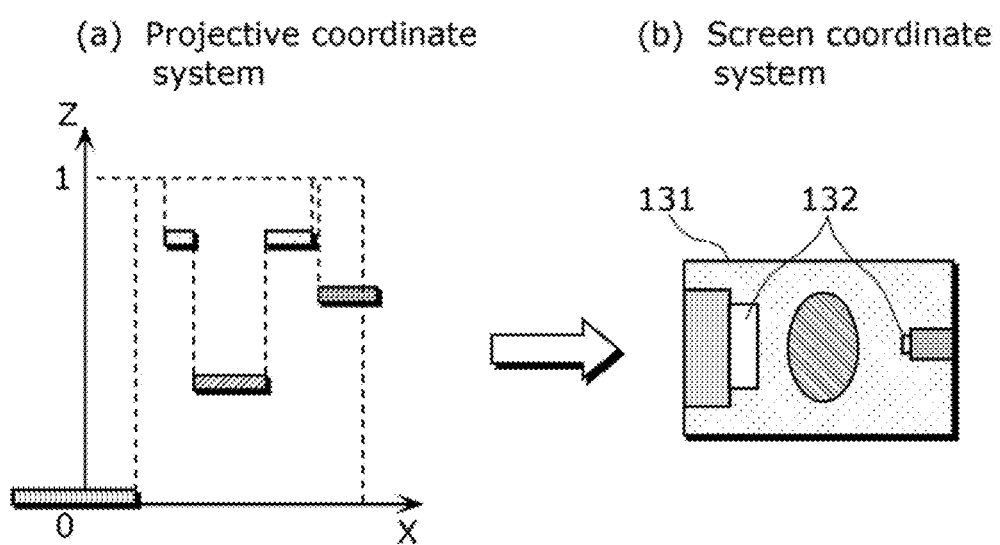
FIG. 5 is a view for describing an example of the processing of the transformed image generating unit in accordance with First embodiment.

FIGS. 3 to 5 each are a view for describing an example of the processing by the transformed image generating unit 103 in accordance with First embodiment. In FIGS. 3 to 5, an X-axis direction and a Y-axis direction express a horizontal direction and a vertical direction, respectively, and a Z-axis direction expresses a depth direction.

First, as shown in FIG. 3, using the input image 121 represented in a screen coordinate system ((a) in FIG. 3) and the depth data 122, the transformed image generating unit 103 generates a three-dimensional model represented in a projective coordinate system ((b) in FIG. 3). That is, using the input image 121 and the depth data 122, the transformed image generating unit 103 calculates a vector Vp (x,y,z) indicating a pixel's position in the projective coordinate system, for each pixel.

The screen coordinate system is a two-dimensional coordinate system corresponding to a display screen. The projective coordinate system is also referred to as a clip coordinate system or a device coordinate system, and is a three-dimensional coordinate system obtained by performing projective transformation in a camera coordinate system. The camera coordinate system is also referred to as a view coordinate system, and is a three-dimensional coordinate system defined based on a view point (camera position) and a line-of-sight direction. In this embodiment, in the camera coordinate system, the view point corresponds to an origin, and the line-of-sight direction corresponds to the Z-axis direction (depth direction).

Subsequently, using the shooting parameter, the transformed image generating unit 103 transforms the three-dimensional model from the projective coordinate system to the camera coordinate system ((c) in FIG. 3). Specifically, as expressed by mathematical expressions (1) to (3), the transformed image generating unit 103 transforms the vector Vp indicating the position of each pixel in the projective coordinate system into a vector Vc indicating the position of each pixel in the camera coordinate system. In the following mathematical expressions (1) to (3), the vectors Vp and Vc, are expressed in homogeneous coordinates.

[Math. 1]

$$Vc = [x'/w' \ y'/w' \ z'/w' \ 1] \quad (1)$$

Here, x', y', z', and w' are calculated according to the following mathematical expression (2),

[Math. 2]

$$[x' \ y' \ z' \ w'] = Vp \times Mpc = [xyz1] \times Mpc \quad (2)$$

A matrix Mpc is an inverse matrix of a projection matrix Mcp. Using a front end distance zn of the depth, a rear end distance zf of the depth, an angle of view fovY, and an aspect ratio Aspect, the projection matrix Mcp is expressed as the following mathematical expression (3).

[Math. 3]

$$Mcp = \begin{bmatrix} \dfrac{\cot\left(\dfrac{fovY}{2}\right)}{\text{Aspect}} & 0 & 0 & 0 \\ 0 & \cot\left(\dfrac{fovY}{2}\right) & 0 & 0 \\ 0 & 0 & \dfrac{zf}{zf-zn} & 1 \\ 0 & 0 & -zn*\dfrac{zf}{zf-zn} & 0 \end{bmatrix} \quad (3)$$

Next, as shown in FIG. 4, the transformed image generating unit 103 changes the view point of the three-dimensional model in the camera coordinate system in response to the instruction to change the view point ((a) and (b) in FIG. 4). Specifically, the transformed image generating unit 103 moves the vector Vc indicating the position of each pixel in the camera coordinate system in a reverse direction to the moving direction of the view point, thereby calculating a vector Vc' indicating the position of each pixel in the camera coordinate system after change of the view point.

Subsequently, the transformed image generating unit 103 transforms the three-dimensional model having the changed view point from the camera coordinate system to the projective coordinate system ((c) in FIG. 4). Specifically, the transformed image generating unit 103 transforms the vector Vc' indicating the position of each pixel in the camera coordinate system after change of the view point to a vector Vp' indicating the position of each pixel in the projective coordinate system. That is, the transformed image generating unit 103 performs projective transformation as expressed by a following mathematical expression (4) to calculate the vector Vp'.

[Math. 4]

$$Vp' = Vc' \times Mcp \quad (4)$$

In this embodiment, the projection matrix Mcp expressed by the mathematical expression (4) is the same as the projection matrix Mcp expressed by the mathematical expression (3). The projection matrix Mcp used herein does not need to be such projection matrix. The projection matrix may be an orthogonal projection matrix or a projection matrix with rotation or inversion. That is, in the case where the transformation parameter includes information indicating the projection matrix, the projection matrix indicated by the transformation parameter may be used.

Finally, as shown in FIG. 5, the transformed image generating unit 103 generates the transformed image 131 expressed in the screen coordinate system from the three-dimensional model expressed in the projective coordinate system ((a) and (b) in FIG. 5). As shown in (b) in FIG. 5, a blank area 132 is present in the transformed image 131. The blank area 132 is a group of blank pixels that do not correspond to any pixel in the input image. According to the blank value (for example, the number of pixels) indicating the size of the blank area 132, it is determined whether or not the transformed image 131 is outputted.

As described above, the image processing device 100 in accordance with this embodiment can switch whether or not the transformed image is outputted according to the size of the blank area detected in the transformed image. Therefore, it is possible to reduce the occurrence of outputting the transformed image of the quality degraded due to a large blank area. Further, in the case where the blank area is large, for example, by performing projective transformation based on an other transformation parameter, the blank area can be reduced and thus, degradation of the quality of the transformed image can be reduced.

Generally, a large number of dispersed small blank areas exert a larger effect on degradation of the image quality than a small number of large blank areas. The image processing device 100 in accordance with this embodiment can output the transformed image in the case where the largest blank value among the blank values of the plurality of blank areas is smaller than or equal to the threshold value. That is, it can be switched whether or not the transformed image is outputted according to the large blank area among the plurality of blank areas, which exerts a large effect on degradation of the image quality, thereby reducing the occurrence of outputting of the transformed image of largely degraded quality.

(Second Embodiment)

Next, Second embodiment will be described. An image processing device in accordance with this embodiment is different from the image processing device in accordance with First embodiment mainly in that pixel values of pixels included in the blank area in the transformed image is complemented, and the complemented transformed image is outputted.

Figure 6:
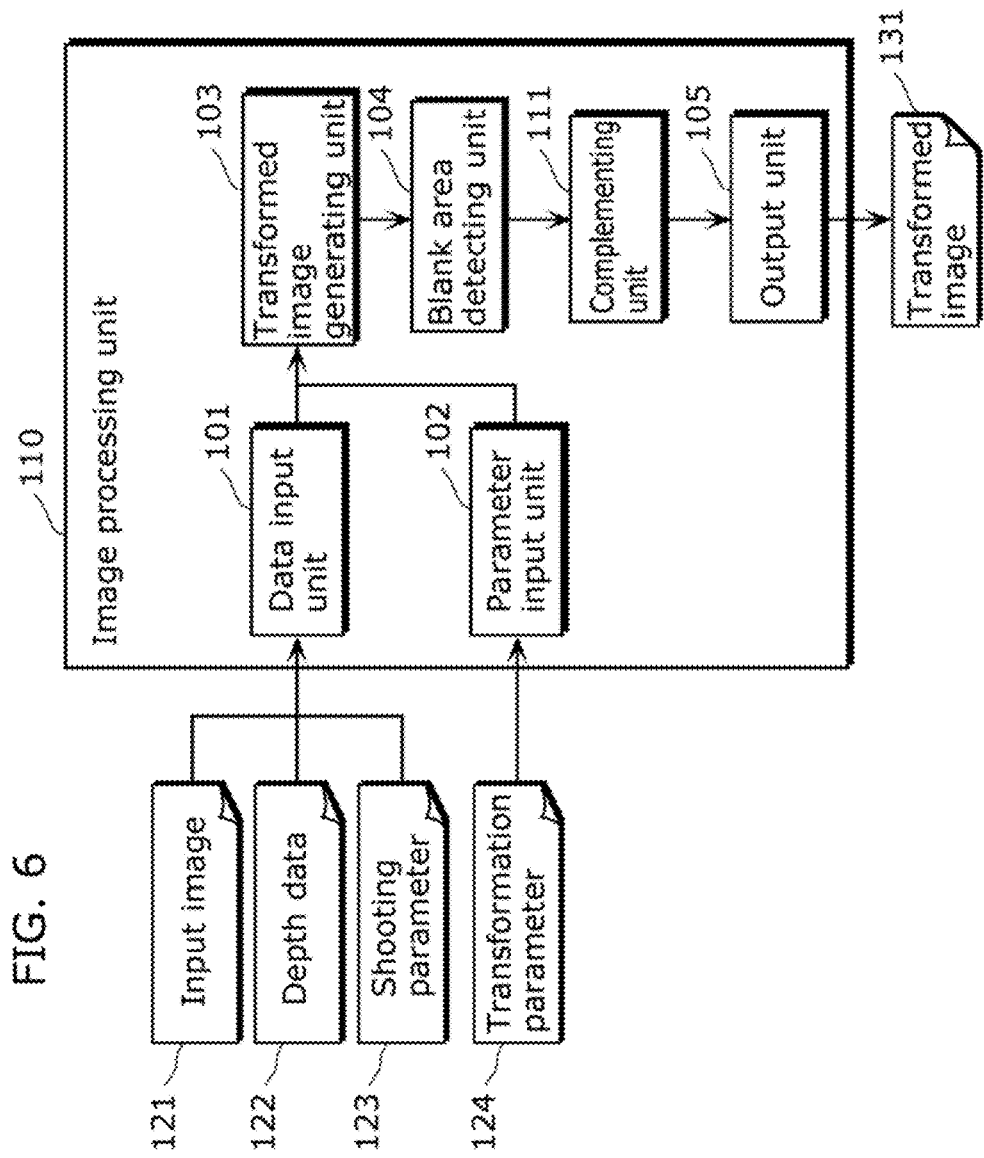
FIG. 6 is a block diagram showing a functional configuration of an image processing device in accordance with Second Embodiment.

FIG. 6 is a block diagram showing a functional configuration of an image processing device 110 in accordance with Second embodiment. The same constituents in FIG. 6 as those in FIG. 1 are given the same reference numerals and description thereof is omitted.

As shown in FIG. 6, the image processing device 110 in accordance with Second embodiment further includes a complementing unit 111.

The complementing unit 111 complements pixel values of pixels in the blank area on the basis of pixel values of pixels near the blank area. Specifically, for example, the complementing unit 111 set pixel values of pixels adjacent to the blank area as the pixel values of the pixels in the blank area. For example, the complementing unit 111 may interpolate the pixel values of the pixels in the blank area, using the pixel values of the pixels near the blank area.

In the case where the blank value is smaller than or equal to the threshold value, the output unit 105 outputs the transformed image in which the pixel values of the pixels in the blank area are complemented by the complementing unit 111.

Next, various operations of the image processing device 110 thus configured will be described.

Figure 7:
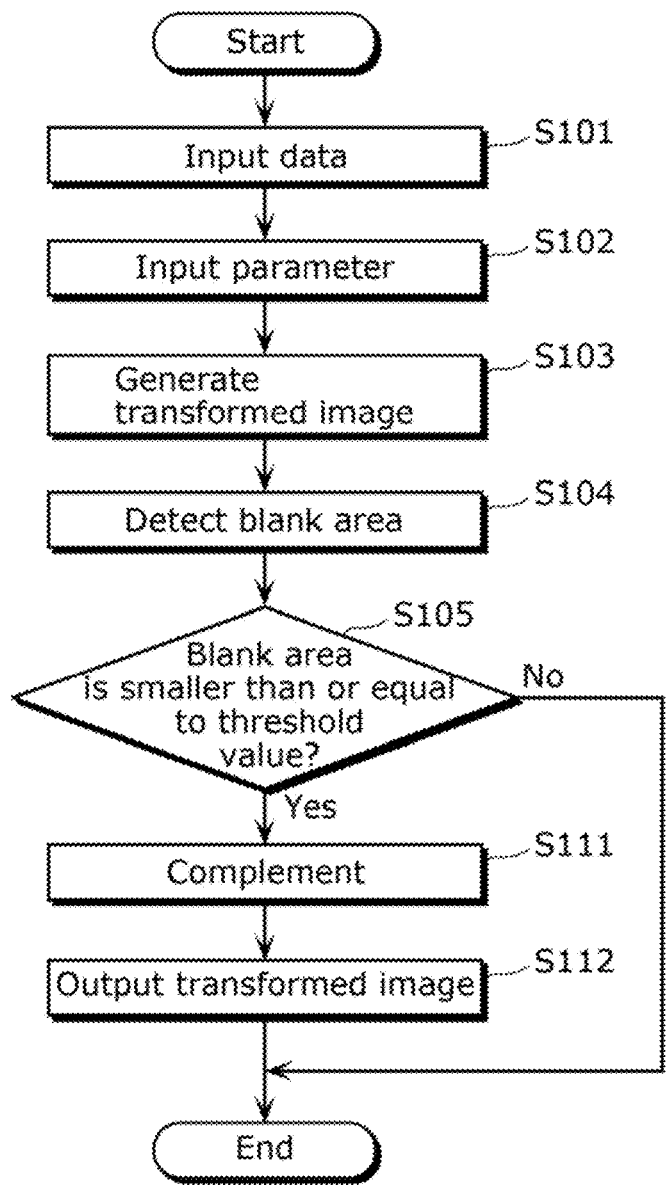
FIG. 7 is a flow chart showing processing of the image processing device in accordance with Second embodiment.

FIG. 7 is a flow chart showing processing of the image processing device 110 in accordance with Second embodiment. The same steps in FIG. 7 as the processing in FIG. 2 are given the same reference numerals and description thereof is omitted.

As in First embodiment, the image processing device 110 executes the processing in Step S101 to S105. In the case where the blank value is smaller than or equal to the threshold value (Yes in S105), the complementing unit 111 complements the pixel values of the pixels in the blank area on the basis of the pixel values of the pixels near the blank area (S111). Subsequently, the output unit 105 outputs the transformed image with the complemented pixel values of the pixels in the blank area (S112).

On the contrary, in the case where the blank value is larger than the threshold value (No in S105), the image processing device 110 finishes processing without any change being made. That is, the transformed image is not outputted.

As described above, the image processing device 110 in accordance with this embodiment can complement the pixel values of the pixels in the blank area on the basis of the pixel values of the pixels near the blank area. Therefore, the image processing device 110 can reduce degradation of the image quality due to the blank area.

(Third Embodiment)

An image processing device in accordance with Third embodiment automatically generates an other transformation parameter, in the case where the blank value is larger than the threshold value. Then, the image processing device in accordance with Third embodiment generates a new transformed image on the basis of the newly generated transformation parameter. The image processing device in accordance with this embodiment will be described below with reference to figures.

Figure 8:
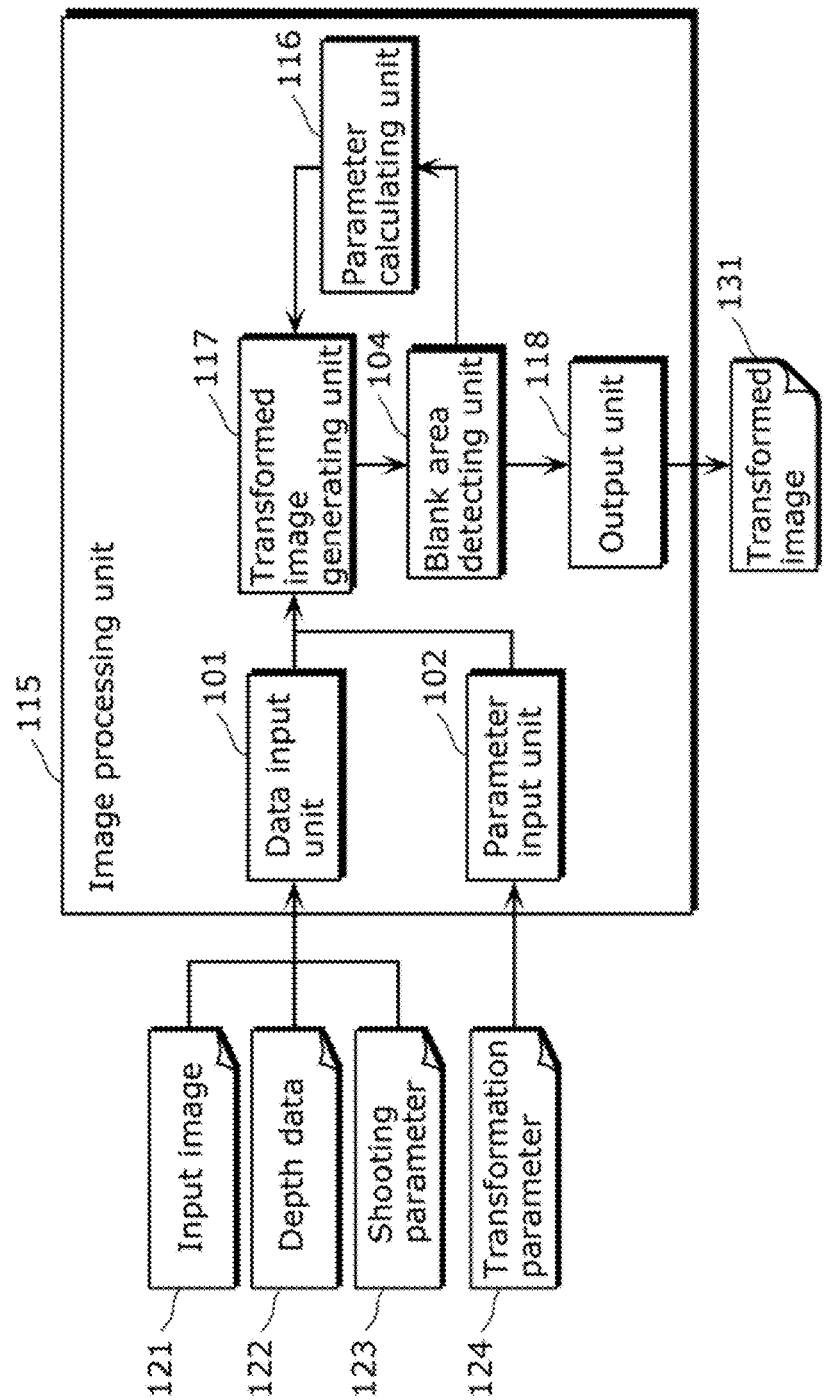
FIG. 8 is a block diagram showing a functional configuration of an image processing device in accordance with Third embodiment.

FIG. 8 is a block diagram showing a functional configuration of an image processing device 115 in accordance with Third embodiment. The same constituents in FIG. 8 as those in FIG. 1 are given the same reference numerals and description thereof is omitted.

As shown in FIG. 8, the image processing device 115 includes a data input unit 101, a parameter input unit 102, a blank area detecting unit 104, a parameter calculating unit 116, a transformed image generating unit 117, and an output unit 118.

In the case where the blank value is larger than the threshold value, the parameter calculating unit 116 interpolates between a transformation parameter corresponding to the input image and a transformation parameter received by the parameter input unit 102 to calculate interpolated transformation parameter. For example, the parameter calculating unit 116 calculates the interpolated transformation parameter by linear interpolation.

The transformation parameter corresponding to the input age refers to the transformation parameter for obtaining the input image by performing projective transformation in the three-dimensional model obtained from the input image, the depth data, and the shooting parameter. Hereinafter, the transformation parameter corresponding to the input image is referred to as an initial transformation parameter. The transformation parameter received by the parameter input unit 102 is referred to as an inputted transformation parameter.

Like the transformed image generating unit 103 in First embodiment, the transformed image generating unit 117 performs projective transformation based on the inputted transformation parameter to generate the transformed image. In the case where the interpolated transformation parameter is calculated by the parameter calculating unit 116, the transformed image generating unit 117 performs projective transformation based on the interpolated transformation parameter thus calculated to generate a new transformed image.

Irrespective of whether or not the blank value is smaller than or equal to the threshold value, the output unit 118 outputs the transformed image generated by the transformed image generating unit 117. The output unit 118 also outputs information indicating a relationship between the blank value and the threshold value. For example, the output unit 118 outputs information indicating a ratio of the blank value to the threshold value or a difference between the threshold value and the blank value.

Next, various operations of the image processing device 115 thus configured will be described.

Figure 9:
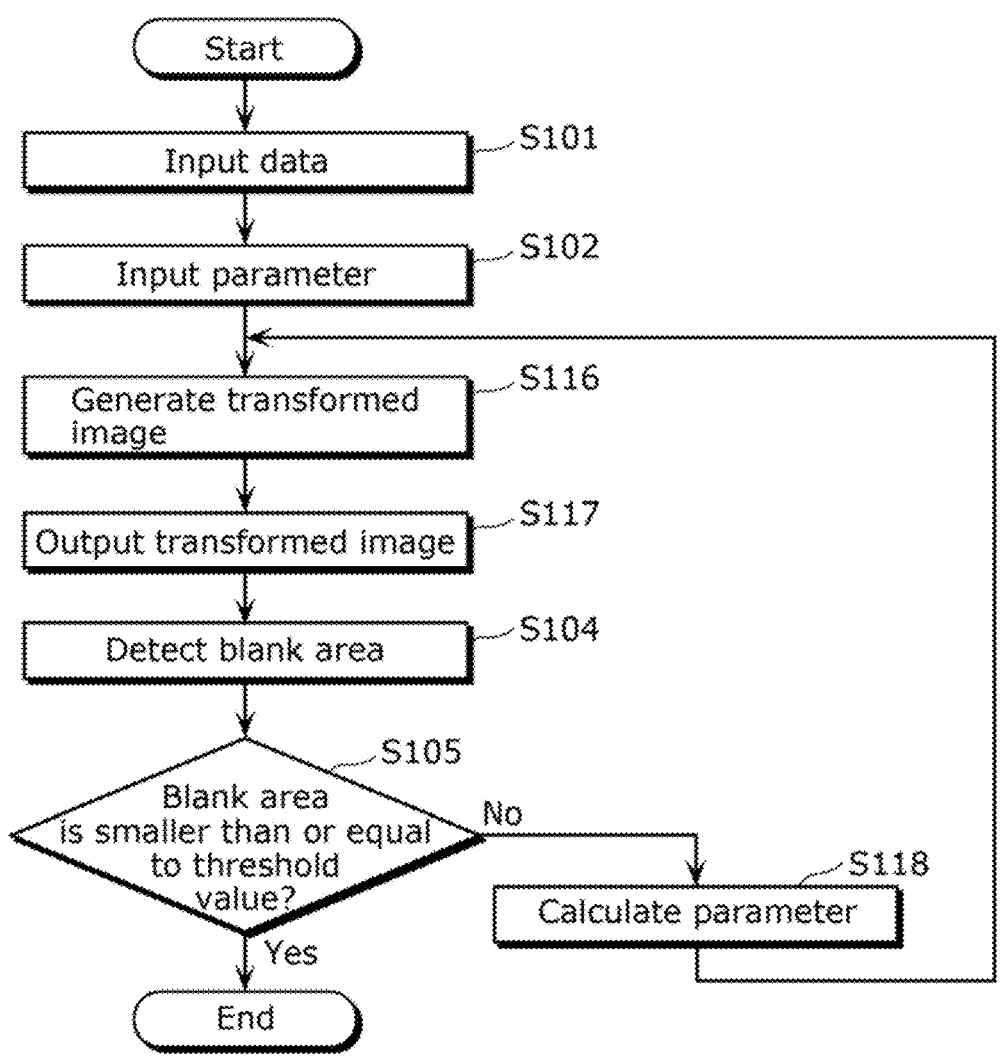
FIG. 9 is a flow chart showing processing of the image processing device in accordance with Third embodiment.

FIG. 9 is a flow chart showing the processing of the image processing device 115 in accordance with Third embodiment. The same steps in FIG. 9 as those in FIG. 2 are given the same reference numerals and description thereof is omitted.

The transformed image generating unit 117 performs projective transformation based on the transformation parameter (inputted transformation parameter) received in Step S102 to generate the transformed image (S116). The output unit 118 outputs the transformed image thus generated (S117).

Subsequently, the blank area detecting unit 104 detects the blank area in the transformed image (S104). Then, the blank area detecting unit 104 determines whether or not the blank value indicating the size of the detected blank area is smaller than or equal to the threshold value (S105). In the case where the blank value is smaller than or equal to the threshold value (Yes in S105), processing is finished.

On the contrary, in the case where the blank value is larger than the threshold value (No in S105), the parameter calculating unit 116 calculates the interpolated transformation parameter (S118). Here, the parameter calculating unit 116 calculates the interpolated transformation parameter such that the interpolated transformation parameter gradually gets closer to the initial transformation parameter from the inputted transformation parameter. That is, in the case where the interpolated transformation parameter has been already calculated, the parameter calculating unit 116 calculates the interpolated transformation parameter that is closer to the initial transformation parameter than to the calculated interpolated transformation parameter.

Subsequently, the transformed image generating unit 117 performs projective transformation based on the interpolated transformation parameter thus calculated to generate a new transformed image (S103). Then, the processing in Steps S117, S104, and S105 is executed again.

As described above, the parameter calculating unit 116 calculates a sequence of the interpolated transformation parameters such that the interpolated transformation parameter gradually gets closer to the initial transformation parameter from the inputted transformation parameter until the blank value becomes smaller than or equal to the threshold value. The transformed image generating unit 117 generates a sequence of the transformed images on the basis of the interpolated transformation parameters. The output unit 118 outputs the sequence of the transformed images.

Figure 10A:
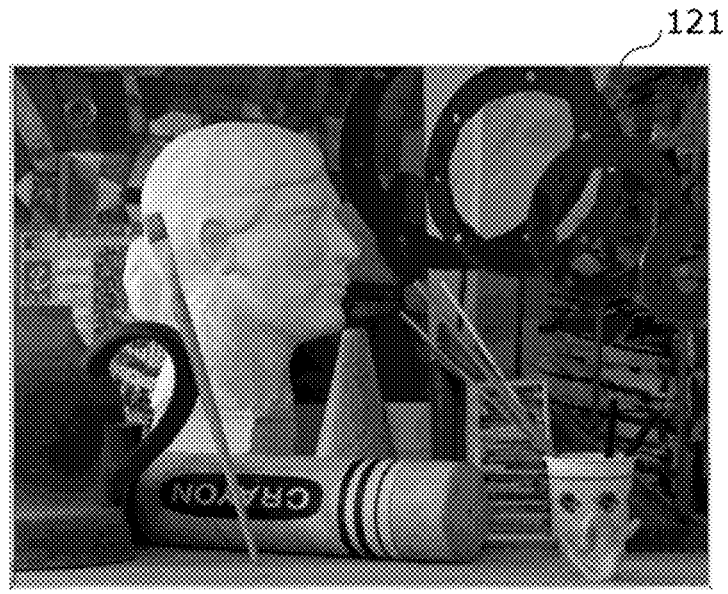
FIG. 10A is a view showing an example of an input image.
Figure 10B:
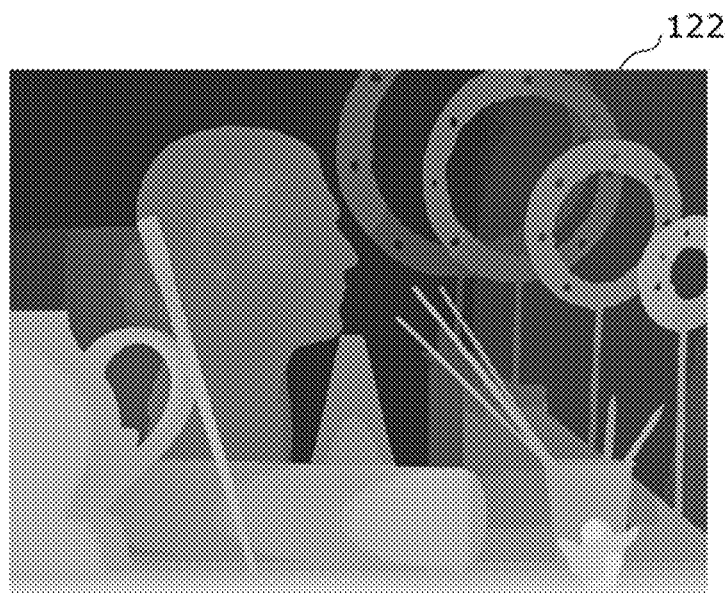
FIG. 10B is a view showing an example of depth data.

Next, a specific example of a GUI used in the above-mentioned image processing will be described. A case where the data input unit 101 receives the input image 121 and the depth data 122 as shown in FIG. 10A and FIG. 10B, respectively, will be described below.

Figure 11:
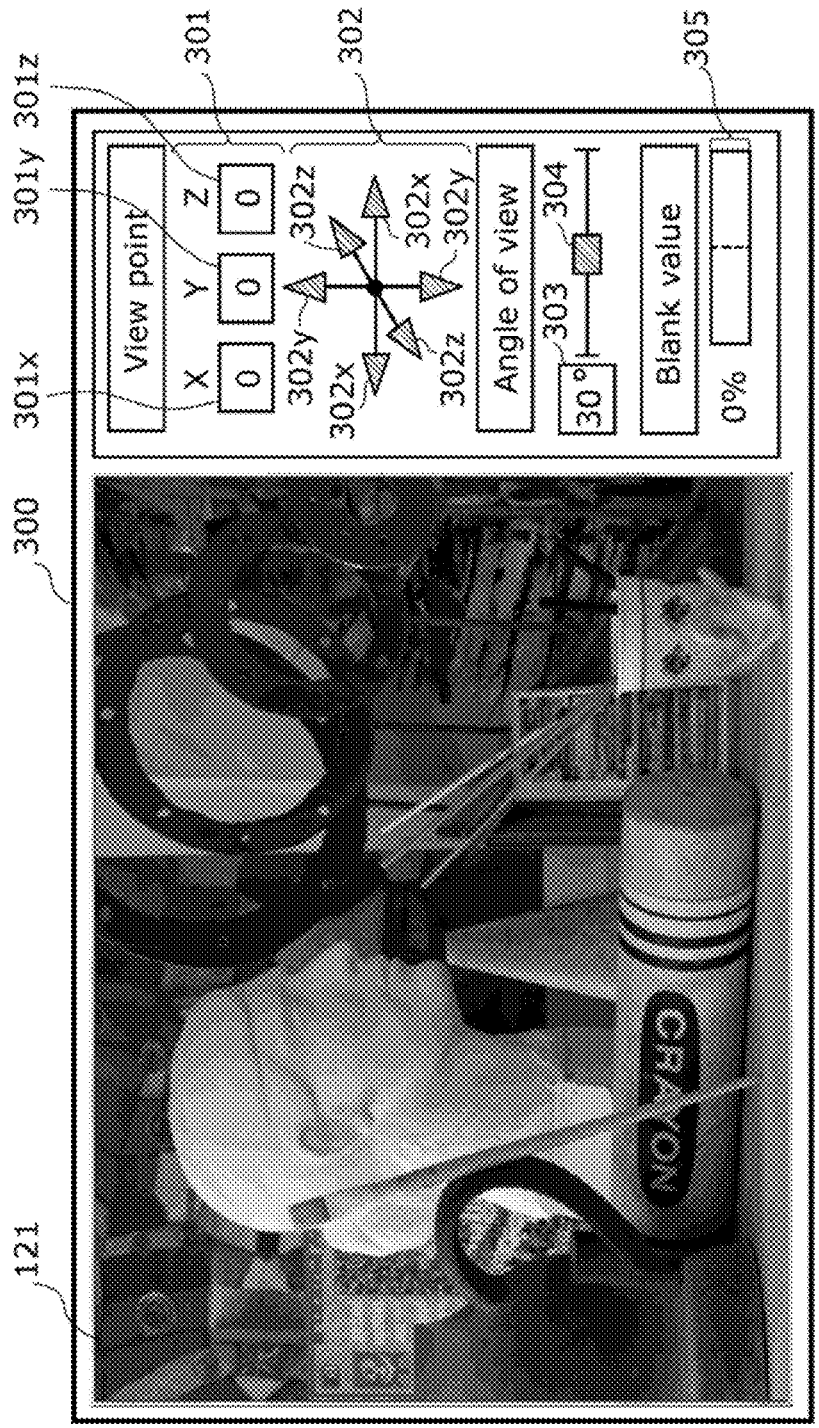
FIG. 11 is a view showing an example of a GUI in an initial state.

FIG. 11 is a view showing one example of a GUI 300 in an initial state. In the initial state, the input image 121 is displayed. The user can designate the transformation parameter (here, the view point and the angle of view) via the GUI 300. As shown in FIG. 11, the GUI 300 has objects 301 to 305.

The object 301 has text boxes 301$x$, 301$y$, 301$z$ for displaying and inputting a value indicating the view point in each of an X-axis direction (horizontal direction), a Y-axis direction (vertical direction), and a 2-axis direction (depth direction). Here, the amount of change from the view point corresponding to the input image is used as the value indicating the view point. By inputting a value to each of the text boxes 301$x$ to 301$z$, the user can change the view point of the currently displayed image (here, the input image 121).

The object 302 has buttons 302$x$ to 302$z$ for changing the view point. The button 302$x$ is a button for changing the view point forward or rearward in the X-axis direction. The button 302$y$ is a button for changing the view point forward or rearward in the Y-axis direction. The button 302$z$ is a button for changing the view point forward or rearward in the Z-axis direction. By pressing the buttons 302$x$ to 302$z$, the user can change the view point of the currently displayed image.

The object 303 has a text box for displaying and inputting a value indicating the angle of view. By inputting a value to the text box, the user can change the angle of view of the currently displayed image.

The object 304 has a slide bar for changing the angle of view. By moving the slide bar to the left or right, the user can change the angle of view of the currently displayed image.

The object 305 has a text and an image, which display information indicating a relationship between the blank value and the threshold value. Here, a ratio of the blank value to the threshold value is used as the information indicating the relationship between the blank value and the threshold value. A hatched area increases or decreases according to the magnitude of the ratio of the blank value to the threshold value.

Figure 12:
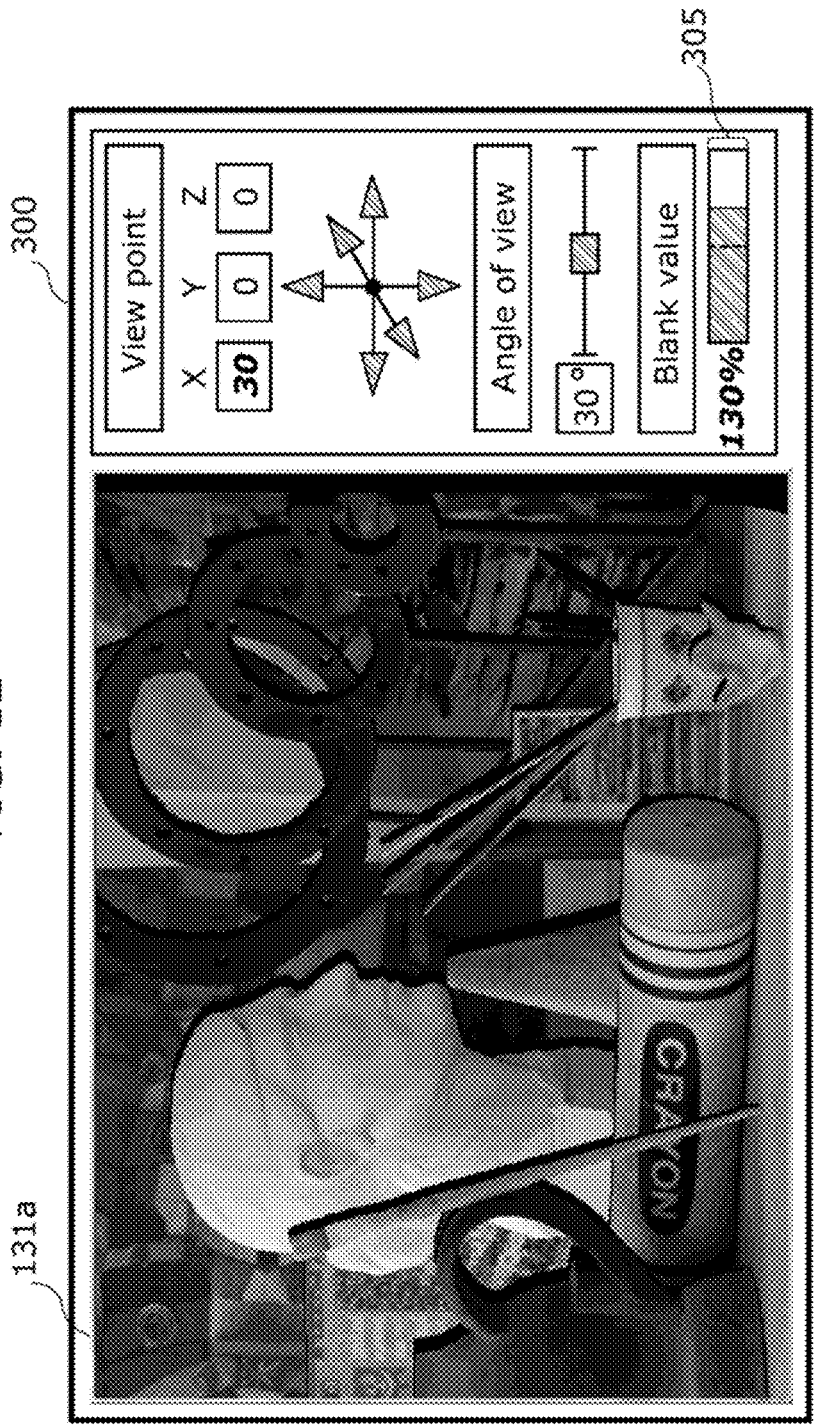
FIG. 12 is a view showing an example of the GUI that displays a transformed image generated based on an inputted transformation parameter.
Figure 13:
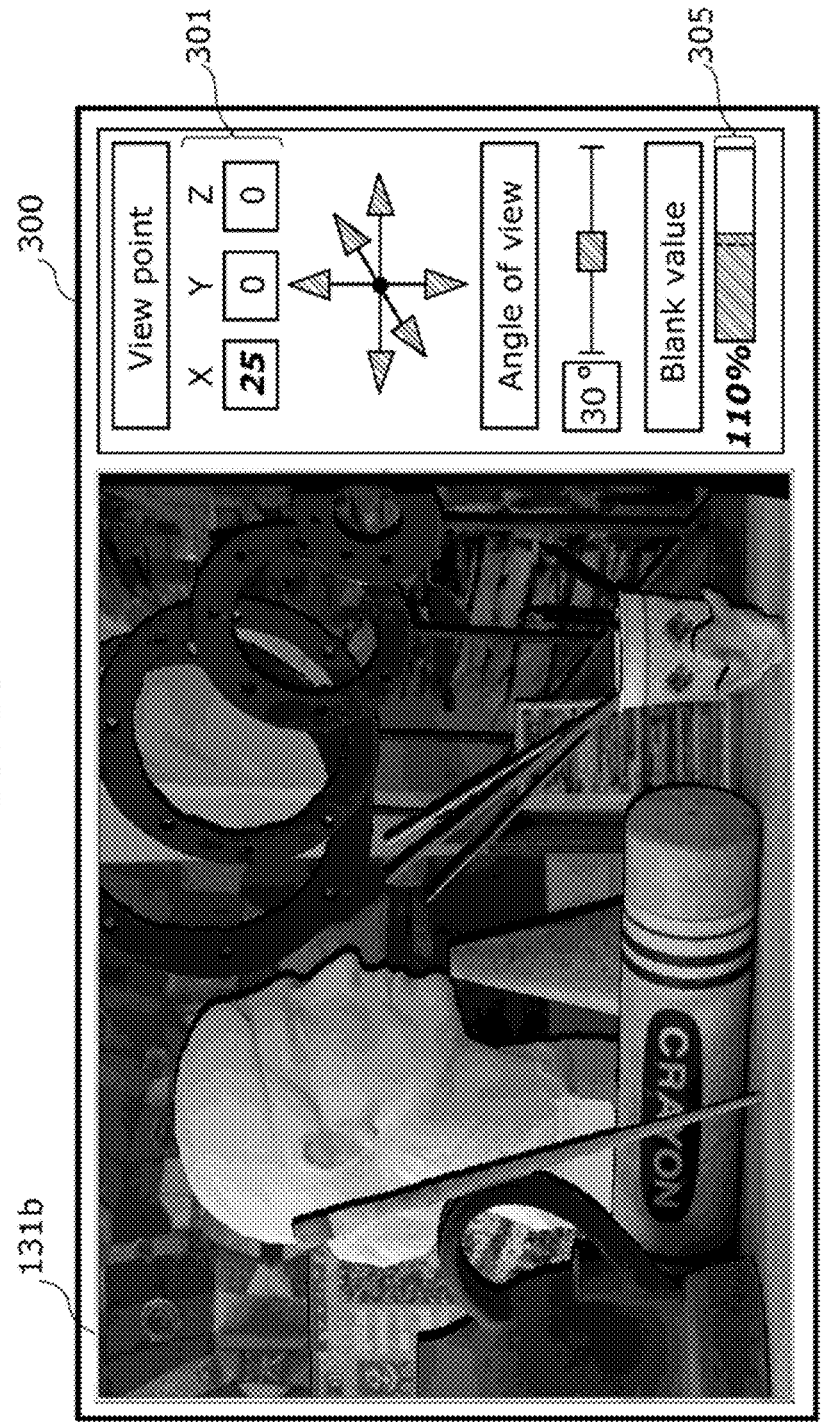
FIG. 13 is a view showing an example of the GUI that displays a transformed image generated based on an interpolated transformation parameter (blank value>threshold value).
Figure 14:
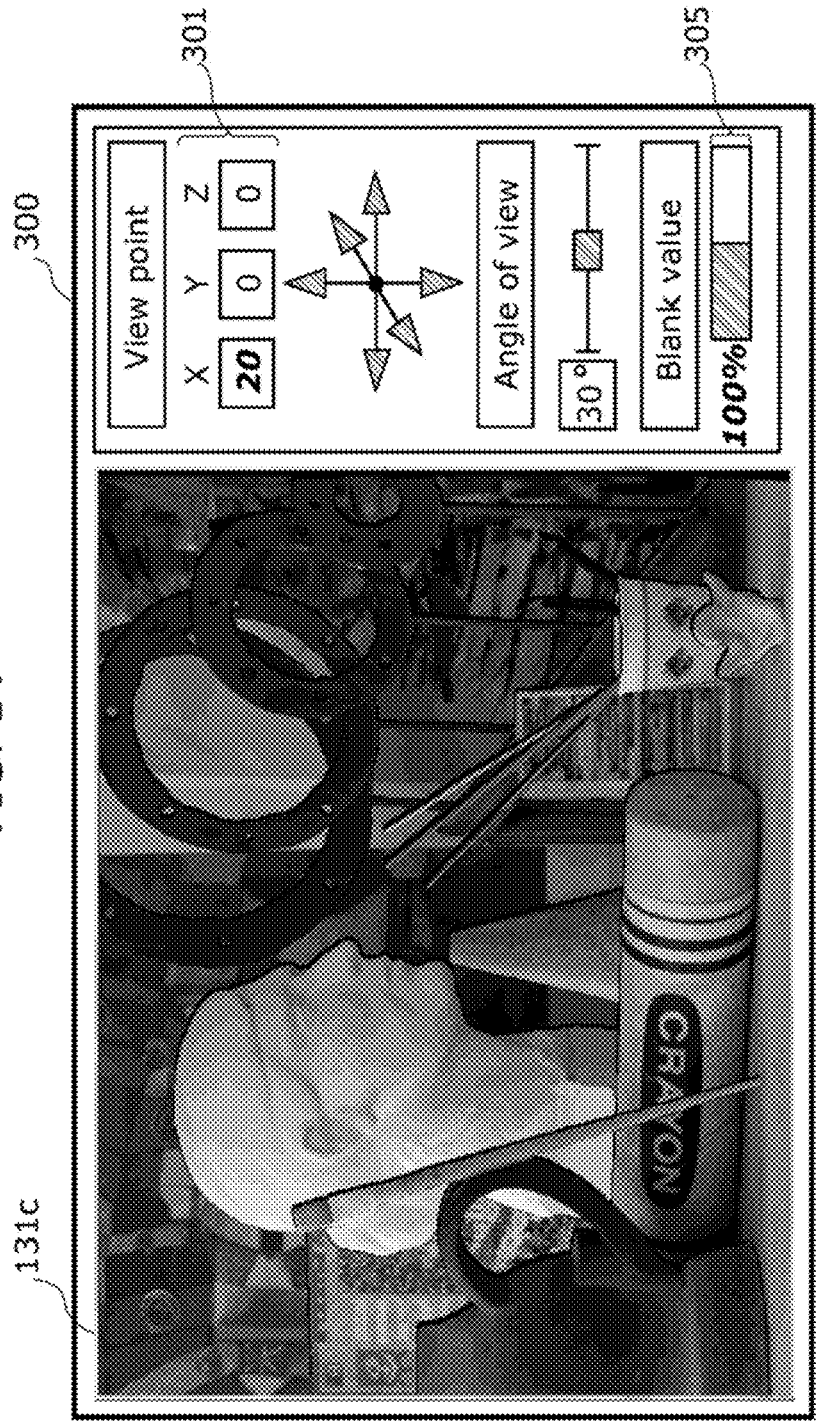
FIG. 14 is a view showing an example of the GUI that displays the transformed image generated based on the interpolated transformation parameter (blank value=threshold value).

A change of the GUI at the time when "30" is inputted as the amount of change of the view point in the X-axis direction will be described with reference to FIG. 12 to FIG. 14. FIG. 12 is a view showing an example of the GUI that displays a transformed image 131a generated based on the inputted transformation parameter. FIG. 13 is a view showing an example of the GUI that displays a transformed image 131b generated based on the interpolated transformation parameter (blank value>threshold value). FIG. 14 is a view showing an example of the GUI that displays a transformed image 131c generated based on the interpolated transformation parameter (blank value=threshold value). The blank area is black-painted.

In the case where "30" is inputted as the amount of change of the view point in the X-axis direction, first, following processing is executed.

First, the parameter input unit 102 receives the transformation parameter showing "30" as the amount of change of the view point in the X-axis direction. Then, the transformed image generating unit 117 performs projective transformation based on the received transformation parameter to generate the transformed image 131a. The output unit 118 outputs the generated transformed image 131a. The output unit 118 also outputs "130%" as the information indicating the relationship between the blank value and the threshold value, which shows the size of the blank area detected from the transformed image 131a by the blank area detecting unit 104.

As a result, as shown in FIG. 12, the transformed image 131a is displayed, and the object 305 is updated. Since the blank value is larger than the threshold value in this case, following processing is further executed.

First, the parameter calculating unit 116 interpolates between the initial transformation parameter and the inputted transformation parameter to calculate the interpolated transformation parameter. Here, the parameter calculating unit 116 performs linear interpolation between the view point indicated by the inputted transformation parameter and the view point indicated by the initial transformation parameter to calculate the interpolated transformation parameter showing "25" as the amount of change of the view point in the X-axis direction. Then, the transformed image generating unit 117 performs projective transformation based on the calculated interpolated transformation parameter to generate the transformed image 131b. The output unit 118 outputs the generated transformed image 131b. The output unit 118 also outputs "110%" as information indicating the relationship between the blank value, which indicates the size of the blank area detected in the transformed image 131b by the blank area detecting unit 104, and the threshold value.

As a result, as shown in FIG. 13, the transformed image 131b is displayed, and the object 301 and the object 305 are updated. Since the blank value is larger than the threshold value also in this case, following processing is further executed.

First, the parameter calculating unit 116 interpolates between the initial transformation parameter and the inputted transformation parameter to calculate the interpolated transformation parameter. Specifically, the parameter calculating unit 116 calculates the interpolated transformation parameter that is closer to the inputted transformation parameter than to the previously calculated interpolated transformation parameter. Here, the parameter calculating unit 116 calculates the interpolated transformation parameter showing "20" as the amount of change of the view point in the X-axis direction. Then, the transformed image generating unit 117 performs projective transformation based on the interpolated transformation parameter thus calculated to generate the transformed image 131c. The output unit 118 outputs the generated transformed image 131c, The output unit 118 also outputs "100%" as information indicating the relationship between the blank value, which is detected by the blank area detecting unit 104, and the threshold value.

As a result, as shown in FIG. 14, the transformed image 131c is displayed, and the object 301 and the object 305 are updated. Since the blank value matches the threshold value, processing is finished.

As described above, in the case where degradation of the image quality of the transformed image is large, the image processing device 115 in accordance with this embodiment can automatically calculate the interpolated transformation parameter that is closer to the initial transformation parameter than to the inputted transformation parameter. Therefore, the image processing device 115 can reduce degradation of the quality of the transformed image.

Further, the image processing device 115 in accordance with this embodiment can calculate the interpolated transformation parameter so as to gradually get closer to the initial transformation parameter. Therefore, the image processing device 115 can automatically calculate the transformation parameter that enables the transformed image to satisfy predetermined image quality. That is, the image processing device 115 can reduce degradation of the quality of the transformed image.

The image processing device 115 can sequentially output the transformed images generated based on the interpolated transformation parameter thus calculated. Therefore, the image processing device 115 can present the state where the quality of the transformed image is being improved like an animation to the user.

The image processing device 115 in accordance with this embodiment can present the level of degradation of the image quality to the user. Therefore, the image processing device 115 can improve the operability of the user in a user interface for image processing.

Although the pixel values of the blank area remain to be the default value (black) in this embodiment, the pixel values of the blank area may be complemented based on the pixel values of the pixels near the blank area as in Second embodiment. In this case, for example, as shown in FIG. 15, the image processing device 115 complements the pixel values of the pixels in the blank area of the transformed image 131c to generate a transformed image 131d. The image processing device 115 outputs the generated transformed image 131d. Thereby, the image processing device 115 can reduce degradation of the image quality due to the blank area.

The parameter calculating unit 116 does not necessarily calculate the transformation parameter by interpolation. For example, the parameter input unit 102 may search an other transformation parameter that reduces the blank area by using a general search algorism. As a result, it is possible to automatically search the transformed image in which the blank value becomes smaller than or equal to the threshold value.

Although the image processing device from one aspect of the present invention has been described with reference to the embodiments, the present invention is not limited to the embodiments. Various modifications of the embodiments, which are devised by those skilled in the art, and combinations of constituents of different embodiments, as long as they do not deviate from the subject matter of the present invention, fail within the scope of the present invention or a plurality of aspects of the present invention.

For example, in each of the embodiments, the blank value is the number of pixels included in the blank area. However, the blank value is not necessarily the number of pixels. For example, the blank value may be a value weighted according to the position of the blank area. Specifically, the blank value may be a value weighted to increase the blank value of the blank area as the position of the blank area is closer to the center of the transformed image.

Generally, the blank area located at the center of the image exerts a larger effect on degradation of the image quality than the blank area located at an edge of the image. Thus, by using the blank value weighted to increase the blank value of the blank area as the position of the blank area is closer to the center of the transformed image as described above, it is possible to switch whether or not the transformed image is outputted according to the blank area among a plurality of blank areas, which exerts a large effect on degradation of the image quality, thereby reducing the occurrence of outputting of the transformed image of largely degraded quality.

The blank value may be a value weighted according to the shape of the blank area. Specifically, the blank value may be a value weighted to increase the blank value of the blank area as the aspect ratio of the blank area is smaller. That is, the blank value may be a value weighted to increase the blank value of the blank area as variation in a distance between the center and the boundary of the blank area is smaller. That is, the blank value may be a value weighted to increase the blank value of the blank area as the shape of the blank area is closer to a circle.

Generally, among the blank areas having the same area, the blank area having a smaller aspect ratio (that is, smaller difference between the vertical width and the horizontal width) exerts a larger effect on degradation of the image quality. Thus, by using the blank value weighted to increase the blank value of the blank area as the aspect ratio of the blank area is smaller as described above, it is possible to switch whether or not the transformed image is outputted according to the blank area among a plurality of blank areas, which exerts a large effect on degradation of the image quality, thereby reducing the occurrence of outputting of the transformed image of largely degraded quality.

In First and Second Embodiments, in the case where the blank value is larger than the threshold value, processing is finished without any change being made. However, the output unit 105 may execute following processing.

For example, in the case where the blank value is larger than the threshold value, the output unit 105 may output information for requesting inputting of an other transformation parameter. Thereby, the image processing device can request inputting of the other transformation parameter in the case where degradation of the quality of the transformed image is large. As a result, the image processing device can also generate the transformed image on the basis of the other transformation parameter, generating the transformed image with less degradation of the image quality due to the blank area.

For example, in the case where the blank value is larger than the threshold value, the output unit 105 may output information indicating that the transformed image cannot be outputted. Thereby, for example, the user can recognize that the transformed image based on the inputted transformation parameter is not outputted.

For example, in the case where the blank value is larger than the threshold value, the output unit 105 may output information for highlighting an object for receiving an instruction from the user to initialize the transformation parameter, as the information for requesting inputting of an other transformation parameter.

Initialization of the transformation parameter means resetting of the transformation parameter to the transformation parameter corresponding to the input image. The object for receiving the instruction from the user is, for example, a GUI object such as a reset button. The information for highlighting is, for example, information to instruct flashing of the object, information to instruct to change a color of the object to a more attractive color, or information to instruct to increase the size of the object.

In the case where the information for highlighting the object is outputted, for example, in the GUI shown in FIG. 12, the object (not shown) for receiving the instruction from the user to initialize the transformation parameter is highlighted.

In this manner, the image processing device can promote the user to initialize the transformation parameter, thereby reducing degradation of the quality of the transformed image. The image processing device can also improve the user's operability.

For example, in the case where the blank value is larger than the threshold value, the output unit 105 may output previously outputted transformed image. Specifically, in the case shown in FIG. 12, for example, the output unit 105 may output, in place of the transformed image 131a, the transformed image outputted when the blank value is smaller than or equal to the threshold value. Thereby, the image processing device can reduce the occurrence of outputting of the transformed image of degraded quality.

Figure 16:
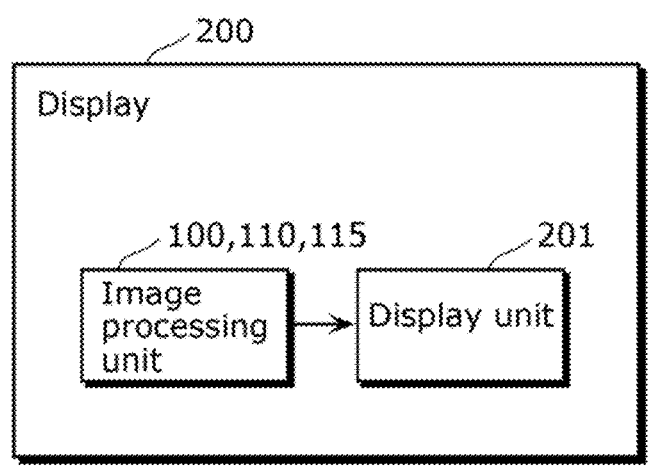
FIG. 16 is a block diagram showing a functional configuration of a display in a modification of First, Second, and Third embodiment.

The image processing device in accordance with each of the embodiments may be provided in a display. FIG. 16 is a block diagram showing a functional configuration of a display 200 in a modification of First, Second, and Third embodiments.

Examples of the display 200 include a television, a digital still camera, a digital video camera, a personal computer, and a mobile phone. As shown in FIG. 16, the display 200 includes the image processing device 100, 110, or 115 and a display unit 201. The image processing device 100, 110, or 115 outputs the transformed image to the display unit 201. When acquiring the transformed image from the image processing device 100, 110, or 115, the display unit 201 displays the transformed image on a screen. Specifically, the display unit 201 displays, for example, the GUI as shown in FIG. 11 to FIG. 14.

Although the transformed image is a two-dimensional image in each of the embodiments, the transformed image may be a three-dimensional image. That is, the transformed image generating unit may generate the three-dimensional image. For example, the transformed image generating unit may generate the transformed image as one of an image for left eye and an image for right eye. In this case, the transformed image generating unit may further generate an image that differs from the above-mentioned transformed image in the view point as the other of the image for left eye and the image for right eye. Then, the display unit may three-dimensionally display the image for left eye and the image for right eye, which are thus generated.

In the case where the image for left eye and the image for right eye are generated, the blank area detecting unit may detect the blank area in both of the image for left eye and the image for right eye. In this case, the blank value may be a statistical representative value (for example, a maximum value or an average value) of a value representing the size of the blank area in the image for left eye and a value representing the size of the blank area in the image for right eye.

Some or all of the constituents of the image processing device in each of the embodiments may be each configured of one system LSI (Large Scale Integration). For example, the image processing device 100 may be configured of a system LSI having the data input unit 101, the parameter input unit 102, the transformed image generating unit 103, the blank area detecting unit 104, and the output unit 105.

The system LSI is a super-multifunctional LSI manufactured by integrating a plurality of constituents, and specifically, is a computer system including a microprocessor, a ROM (Read Only Memory), a RAM (Random Access Memory) and so on. A computer program is stored in the ROM. The microprocessor operates according to the computer program, resulting in that the system LSI performs its function.

The system LSI is used herein, and the system LSI may be called an IC, an LSI, a super LSI, or an ultra LSI depending on the degree of integration. An integrated circuit is not limited to the LSI, and may be implemented by a dedicated circuit or a general-purpose processor. An FPGA (Field Programmable Gate Array) capable of being programmed after manufacturing of the LSI or a reconfigurable processor capable of reconfiguring connection and setting of circuit cells in the LSI may be adopted.

As a matter of course, a possible integrated-circuit technology taking the place of the LSI due to the progress of the semiconductor technology or the appearance of other derivative technologies may be used to integrate functional blocks. The biotechnology could be applied.

In each of the above-mentioned embodiments, each constituent may be configured of a dedicated hardware, or may be realized by executing a software program suitable for each constituent. A program execution unit such as a CPU or a processor may read and execute a software program recorded in a recording medium such as a hard disc or a semiconductor memory to realize each component. The software for realizing the communication control system and the communication device in the above-mentioned embodiments is a following program.

That is, the program causes a computer to perform steps of receiving an input image, depth data indicating depth of the input image, and a shooting parameter of the input image, receiving a transformation parameter as a parameter on projective transformation of a three-dimensional model, performing projective transformation based on the transformation parameter in the three-dimensional model obtained from the input image, the depth data, and the shooting parameter to generate a transformed image, detecting a blank area in the transformed image, the blank area being a group of blank pixels that do not correspond to any pixel in the input image, and outputting the transformed image in the case where a blank value indicating the size of the blank area is smaller than or equal to a threshold value.

An image in following papers is used as an original of the image shown in FIG. 10A to FIG. 15.

(1) D. Scharstein and C. Pal. Learning conditional random fields for stereo. In IEEE Computer Society Conference on Computer Vision and Pattern Recognition (CVPR 2007), Minneapolis, Minn., June 2007, (2) H. Hirschmuller and D. Scharstein. Evaluation of cost functions for stereo matching. In IEEE Computer Society Conference on Computer Vision and Pattern Recognition (CVPR 2007), Minneapolis, Minn., June 2007.

The present invention can be applied to the image processing device capable of transforming the input image by use of the depth data, or a television, a digital still camera, a digital video camera, a personal computer and a mobile phone that are provided with the image processing device.

REFERENCE SIGNS LIST 100, 110, 115 image processing device
101 data input unit
102 parameter input unit
103, 117 transformed image generating unit
104 blank area detecting unit
105, 118 output unit
111 complementing unit
116 parameter calculating unit
121 input image
122 depth data
123 shooting parameter
124 transformation parameter
131, 131a, 131b, 131c, 131d transformed image
132 blank area
200 display
201 display unit
300 GUI
301, 302, 303, 304, 305 object
301x, 301y, 301z text box
302x, 302y, 302z button

The invention claimed is:

1. An image processing device comprising:
a data input unit configured to receive an input image, depth data indicating depth of the input image, and a shooting parameter of the input image;
a parameter input unit configured to receive a transformation parameter as a parameter on projective transformation of a three-dimensional model;
a transformed image generating unit configured to generate a transformed image by performing projective transformation based on the transformation parameter in the three-dimensional model obtained from the input image, the depth data, and the shooting parameter;
a blank area detecting unit configured to detect a blank area in the transformed image, the blank area being a group of blank pixels that do not correspond to any pixel in the input image; and
an output unit configured to output the transformed image in the case where a blank value indicating size of the blank area is smaller than or equal to a threshold value, and not to output the transformed image in the case where the blank value is larger than the threshold value,
wherein the blank value is a value weighted to increase the blank value of the blank area as the position of the blank area is closer to a center of the transformed image.

2. The image processing device according to claim 1,
wherein the blank area detecting unit configured to detect a plurality of blank areas, each of the blank areas being configured of a group of adjacent blank pixels, and
the output unit is configured to output the transformed image in the case where a largest blank value among blank values of the plurality of blank areas is smaller than or equal to the threshold value.

3. The image processing device according to claim 1, wherein the blank value is a value weighted to increase the blank value of the blank area as an aspect ratio of the blank area is smaller.

4. The image processing device according to claim 1, further comprising
a complementing unit configured to complement pixel values of pixels of the blank area on the basis of pixel values of pixels near the blank area,
wherein the output unit is configured to output the transformed image with the complemented pixel values of the pixels of the blank area in the case where the blank value is smaller than or equal to the threshold value.

5. The image processing device according to claim 1, wherein the parameter input unit is configured to receive an instruction from a user to change the view point with respect to the input image, as the transformation parameter, and
the transformed image generating unit performs projective transformation based on the view point identified according to the transformation parameter to generate the transformed image.

6. The image processing device according to claim 1, wherein the output unit is further configured to output information for requesting inputting of another transformation parameter in the case where the blank value is larger than the threshold value.

7. The image processing device according to claim 6, wherein the output unit is configured to output information for highlighting an object for receiving an instruction from a user to initialize the transformation parameter, as the information for requesting inputting of the another transformation parameter, in the case where the blank value is larger than the threshold value.

8. The image processing device according to claim 1, wherein, the output unit is further configured to output the transformed image previously outputted, in the case where the blank value is larger than the threshold value.

9. The image processing device according to claim 1, further comprising
a parameter calculating unit configured to calculate an interpolated transformation parameter by interpolating between the transformation parameter corresponding to the input image and the transformation parameter received by the parameter input unit, in the case where the blank value is larger than the threshold value,
wherein the transformed image generating unit further generates a new transformed image by performing projective transformation based on the interpolated transformation parameter thus calculated.

10. The image processing device according to claim 9, wherein the parameter calculating unit is configured to calculate a sequence of the interpolated transformation parameters that in the sequence gradually become closer from the transformation parameter received by the parameter input unit to the transformation parameter corresponding to the input image until the blank value becomes smaller than or equal to the threshold value,
the transformed image generating unit is configured to generate a sequence of the transformed images on the basis of the sequence of the interpolated transformation parameters, and
the output unit is configured to output the sequence of the transformed images.

11. The image processing device according to claim 1, wherein the output unit is further configured to output information indicating a relationship between the blank value and the threshold value.

12. The image processing device according to claim 1, wherein the image processing device is configured as an integrated circuit.

13. An image processing method comprising:
receiving an input image, depth data indicating depth of the input image, and a shooting parameter of the input image;
receiving a transformation parameter as a parameter on projective transformation of a three-dimensional model;
performing projective transformation based on the transformation parameter in the three-dimensional model obtained from the input image, the depth data, and the shooting parameter to generate a transformed image;
detecting a blank area in the transformed image, the blank area being a group of blank pixels that do not correspond to any pixel in the input image; and
outputting the transformed image in the case where a blank value indicating size of the blank area is smaller than or equal to a threshold value, and not to output the transformed image in the case where the blank value is larger than the threshold value,
wherein the blank value is a value weighted to increase the blank value of the blank area as the position of the blank area is closer to a center of the transformed image.

14. A computer-readable non-transitory recording medium having a program recorded thereon for causing a computer to perform the image processing method according to claim 13.

* * * * *